US007698193B2

United States Patent
Davin, III et al.

(10) Patent No.: US 7,698,193 B2
(45) Date of Patent: Apr. 13, 2010

(54) CLOSING PRICE DETERMINATION FOR AN AUTOMATED MARKET SYSTEM

(75) Inventors: Thomas J. Davin, III, Kensington, MD (US); James T. Platts, Washington, DC (US); James M. Lastoskie, Upland, CA (US); Timothy E. Cox, Chevy Chase, MD (US); Michael E. Edleson, Dunn Loring, VA (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1518 days.

(21) Appl. No.: 10/437,416

(22) Filed: May 12, 2003

(65) Prior Publication Data

US 2004/0230513 A1    Nov. 18, 2004

(51) Int. Cl.
*G06Q 99/00* (2006.01)

(52) U.S. Cl. .................................................... 705/36 R
(58) Field of Classification Search ..................... 705/37
See application file for complete search history.

(56) References Cited

OTHER PUBLICATIONS

The Federal Register vol. 67, No. 248 Dec. 26, 2002.*
Rajesh Gajra "Closing Prices" Outlook Money, May 19, 1999.*

* cited by examiner

*Primary Examiner*—Thu-Thao Havan
*Assistant Examiner*—Thomas M Hammond, III
(74) *Attorney, Agent, or Firm*—Fish & Richardson P.C.

(57) ABSTRACT

A method for determining a closing price of a security traded in an electronic market includes receiving a trade price of an executed trade of the security wherein the executed trade is executed during a trading session of the electronic market, comparing the received trade price to a market parameter of the security to determine the closing price of the security, and reporting the determined closing price of the security to a user.

39 Claims, 3 Drawing Sheets

CLOSING PRICE DETERMINATION FOR AN AUTOMATED MARKET SYSTEM

BACKGROUND

This invention relates to trading systems particularly financial trading systems.

Electronic equity markets, such as The Nasdaq Stock Market® collect, aggregate and display trade information to market participants. Market participants initiate trades of securities by sending trade information to the electronic market on which the securities are traded. After trades, the market participant receives confirmation that the initiated trades have been executed then typically within ninety seconds after execution of a particular trade, a trade report is produced so the electronic market can report the executed trade. Since trade reports are sent up to ninety seconds after execution of the respective trade, one or more trade reports may be received by the electronic market as much as ninety seconds after the end of the trading session in which the trades were executed. Typically the last trade report received for an executed trade is passively used to calculate the closing price of the respective security. However, in some instances this last trade report may not appropriately represent the value of the security at the end of the trading session.

SUMMARY

According to an aspect of the present invention, a method for determining a closing price of a security traded in an electronic market includes, receiving a trade price of an executed trade of the security wherein the executed trade is executed during a trading session of the electronic market, comparing the received trade price to a market parameter of the security to determine the closing price of the security, and reporting the determined closing price of the security to a user.

According to an additional aspect of the present invention, a computer program product residing on a computer readable medium, for determining a closing price of a security traded in an electronic market, includes instructions to cause a computer to receive a trade price of an executed trade of the security wherein the executed trade is executed during a trading session of the electronic market, compare the received trade price to a market parameter of the security to determine the closing price of the security, and report the determined closing price of the security to a user.

According to an additional aspect of the present invention, a closing price process, for determining a closing price of a security traded in an electronic market, includes a receiving process to receive a trade price of an executed trade of the security wherein the executed trade is executed during a trading session of the electronic market, a comparing process to compare the received trade price to a market parameter of the security to determine the closing price of the security, and a reporting process to report the determined closing price of the security to a user.

One or more of the following features may also be included.

The trade price may be received after the end of the trading session of the electronic market. The trade price may be received within two seconds after the end of the trading session of the electronic market. The trade price may be received after the end of the trading session but prior to the end of a time period during which another trade price is receivable. The market parameter of the security may include an inside market of the security at the time the trade price is received. The market parameter of the security may include an inside market of the security at the end of the trading session. The closing price may be the value of the trade price if the trade price is within the inside market of the security. The closing price may be the value of a best ask of the inside market if the trade price is larger than the best ask. The closing price may be the value of a best bid of the inside market if the trade price is smaller than the best bid. The reported closing price may be retracted if the received trade price is cancelled. The received trade price may be cancelled within a time period after the end of the trading session. The reported closing price may be retracted if the received trade price is corrected. The determined closing price may be reported after a time period following the end of the trading session. A trade report may include the trade price.

One or more advantages can be provided from the above. By identifying the last sale-eligible trade report for a particular security that is received within a time period (e.g., 2 seconds) after the ending of the current trading session, the trade price included in the trade report is used to calculate a closing price that represents the value of the security at the close of normal market hours. Additionally, by disregarding trades received beyond this time period after the end of the trading session, the security closing price is not altered by trade reports that are significantly different from the inside market of the security at the end of the trading session. Further, by actively comparing this last sale-eligible trade report to the inside market of the security, the calculated closing price is more representative of the state of the security at the end of the trading session.

DETAILED DESCRIPTION

Figure 1:
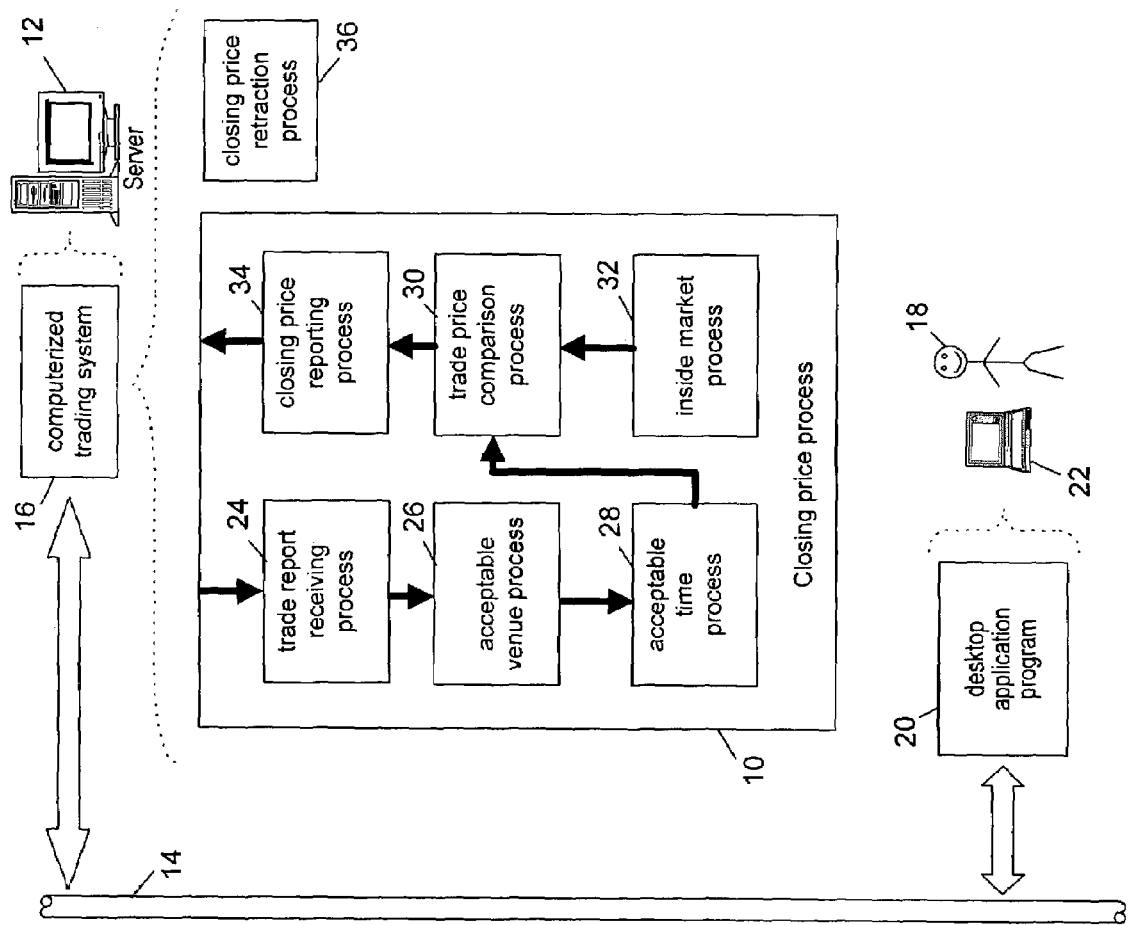
FIG. 1 is a diagrammatic view of a closing price process.

Referring to FIG. 1, a closing price process 10 resides on a storage device (not referenced) of a server 12 that is connected to a distributed computing network 14 (e.g., the Internet, an intranet, a local area network, or other similar form of network). The server 12 reads the storage device to place the closing price process 10 in memory (not shown) so that it can be executed by a processor (not shown). Computerized trading system 16, which trades securities electronically and also resides on server 12, processes trade information (e.g., quotes, orders, etc.) entered by user 18 (e.g., a market participant, a market maker, etc.). In some arrangements user 18 accesses computerized trading system 16 via a desktop application 20 (e.g., Microsoft Internet Explorer™, Netscape Navigator™, a specialized desktop interface, etc.) residing on a desktop computer 22. However, in other arrangements access is provided by other commercial or custom software packages. After a trade is executed at a particular trade price by computerized trading system 16, the computerized trading system produces a trade report. In some arrangements the trade report includes information associated with the executed trade such as the particular security traded, the volume traded, the price of the trade, and so forth. Also, over the course of a trading day numerous trade reports associated with securities traded are received by computerized trading system 16. At the end of the trading session, closing price process 10 uses the received trade reports along with one or more market parameters (e.g., security inside market) that characterize the financial status of the respective securities. After receiving the trade reports and market parameters, closing price process 10 calculates a closing price for each security traded during the trading session and soon thereafter releases the closing prices for use in after-market activities such as for use with pricing indices, large institutional orders, mutual fund values, after-hours trading and so forth.

In a computerized trading system 16 the user 18 electronically trades with other users (as opposed to trading on a trading floor). In a computerized trading system trading can occur over extended periods of time. An example of an electronically trading system is the Nasdaq Stock Market™ and an example of a floor-trading system is the New York Stock Exchange™. As traditional, floor-traded trading systems typically need interactions on a trading floor between human traders to accomplish security trades, this trading most typically occurs during the regular trading hours also know as a trading session (i.e., 9:30 a.m. to 4:00 p.m. ET). Similarly, electronically traded stock markets, such as computerized trading system 16 allow trading during a trading session (i.e., 9:30 a.m. to 4:00 p.m. ET). However, in some arrangements electronically traded stock markets additionally allow for extended-hours trading between traders via computers before or after normal trading hours. For example, the Nasdaq Stock Market™ allows trading before normal business hours (between 8:00 a.m. and 9:30 a.m. ET) and after normal business hours (between 4:00 p.m. and 6:30 p.m. ET).

Both floor-trading systems and electronic trading systems typically end individual trading sessions at the end of the respective business day (i.e., 4:00 p.m. ET) and re-start trading during the next business day to initiate another trading session. Prior to initiating trading during the next trading session, closing price process 10 determines the closing price of each security electronically traded on computerized trading system 16. By determining the closing price after the end of each trading session, a starting price for each security is established for the next trading session along with providing the closing price for use with after-market activities performed by computerized trading system 16 and other entities. To determine the closing price for each security, closing price process 10 uses the information included in trade reports that are received from users such as user 18 by computerized trading system 16 after the execution of each trade.

To keep an appropriate accounting of executed trades, computerized trading system 16 requires that each trade report be received within a fixed time period after each respective trade is execute. For example, computerized trading system 16 requires that each trade report be received within, e.g., 90 seconds of each respective trade execution. However, since trades are typically executed up to the end of a trading session (i.e., 4:00 p.m. ET), trade reports can be received 90 seconds after the end of the trading session (i.e., 4:01:30 p.m. ET). Due to increases in computation speed and network bandwidth, trade reports are typically received by computerized trading system 16 nearly instantly after the execution of the respective trade. Typically for trades executed near the end of a trading session (i.e., 4:00 p.m. ET), a large percentage of the associated trade reports are received within seconds by computerized trading system 16. Since a large percentage of trade reports are received far in advance of the required 90-second time period, closing price process 10 determines the closing price from the trade reports received within seconds of the end of the trading session and not from the smaller percentage of trade reports received near the end of the 90-second time period. Further, by determining the closing price from the large percentage of trade reports received within seconds after the end of the trading session, the probability of a user setting a closing price with a non-representative value (i.e., "gaming") by transmitting a trade report for reception near the end of the 90-second time period is reduced.

For example, closing price process 10 determines the closing price for each traded security from the last respective trade report received by computerized trading system 16 at or prior to two seconds after the end of the trading session (i.e., 4:00:02 p.m. ET). Thus the last trade report, for each traded security, received at or prior to two seconds after the end of a trading session is used to determine the closing price and trade reports received between two seconds after the end of the trading session (4:00:02 p.m. ET) and ninety seconds after the end of the trading session (4:01:30 p.m. ET) are not used to determined the closing price, but are still reported.

Any trading system that includes a computerized component for automated trading can trade electronically. Accordingly, a floor-traded system can trade electronically if there is a computerized component, which facilitates the floor trades. For example, some floor-traded systems include computer systems to establish opening quotes, track entered orders (e.g., manually entered, electronically entered, etc.), and track order execution (e.g., in electronic order book) on the trading floor. Additionally the computer systems are used to report the executed trades to entities not located on the trading floor. So even for floor trading there are decisions that are made to determine a closing price for securities traded on a floor-traded system and trade reports received prior to a time (e.g., 4:00:02 p.m. ET) after the end of the trading session. Therefore, the trading systems encompassed herein could include systems such as the New York Stock Exchange.

Additionally, to provide a representative closing price for each security traded on computerized trading system 16, closing price process 10 determines if the trade price included in the last respective trade report received at or prior to 4:00:02 p.m. ET is within the inside market of the respective security. In this particular arrangement, if the trade price is at or within the inside market (i.e., the highest bid and the lowest ask prices made by market makers for their inventories of a security), the closing price is the value of the trade price included in the trade report. However, if the trade price is not at or within the inside market, closing price process 10 sets the closing price value to be the value of the best bid or best ask price of the inside market dependent upon if the trade price is larger or smaller than the inside market of the security. To determine if the trade price is within the inside market of the security, the trade price is compared to the inside market. If the trade report that includes the trade price is received by computerized trading system 16 during the trading session, the inside market at the reception time of the trade report is used for in the comparison. But if the trade report is received after the end of the trading session (i.e., 4:00 p.m. ET), the inside market at the time of the trading session end is used for comparison. For example, if the trade report is received by computerized trading system 16 prior to the end of the trading session (i.e., prior to 4:00 p.m. ET) closing price process 10 compares the trade price in the trade report to the inside market at the time the trade report was received. But if the trade report is received after the end of the trading session but at or prior to two-seconds after the end of the trading session (e.g., between 4:00:00 p.m. and 4:00:02 p.m. ET), closing price process 10 compares the trade price included in the trade report to the inside market at the end of the trading session (i.e., at 4:00:00 p.m. ET).

After the appropriate inside market is determined, closing price process 10 determines if the respective trade price is larger, smaller, or within the inside market. If the trade price is larger than the "best ask" of the inside market, the value of the closing price is set to the value of the best ask. If the closing price is smaller than the "best bid" of the inside market, the value of the closing price is set to the value of the best bid. By adjusting the closing price to be within the inside market of the associated security, closing price process 10 ensures that the closing price is not set by a trade price that does not appropriately represent the value of the security at end of the trading session. Thus, a trade price associated with an "outlier" trade is adjusted to reflect the inside market prior to setting the closing price. In this particular arrangement, the inside market of the respective security was compared to the trade price of the last received sale-eligible trade during or within two seconds of the ending of a trading session. However, in some arrangements one or more other market parameters, for example, associated with the trading price of the respective security such as a high or low trading price or other parameter that represents a security's price or value can be used individually or in combination with the respective inside market of the security for setting the closing price. Once the closing prices are determined for each of the securities traded by computerized trading system 16, closing price process 10 reports each closing price for use in after market activities. However, in some arrangements closing price process 10 does not release the determined closing prices until all the trade reports have been received. In this particular example, closing price process 10 releases the closing prices after the 90-second time period that trade reports are receivable (i.e., after 4:01:30 p.m. ET). By delaying the release of the closing prices, closing price process 10 ensures that all trade reports are received prior to providing the closing price for after market activities. However, closing price process 10 allows for trade reports to be cancelled or corrected for a period of time after the end of a trading session. For example, computerized trading system 16 allows the user 18 or other market participants to cancel or correct a trade report until 5:15 p.m. ET. Since a received trade report, which may be used to set the closing price of a security, may be cancelled or corrected after the closing price is determined (i.e., at or prior to 4:00:02 p.m. ET) and reported (i.e., at 4:01:30 p.m. ET), closing price process 10 is capable of retracting a reported closing price and recalculating the closing price from received corrected information that is associated with a corrected trade report. For cancelled trade reports, closing price process 10 uses the next eligible trade report to recalculate the closing price of the associated security. Once the closing price is retracted and corrected, closing price process 10 re-reports the revised closing price.

As shown in FIG. 1, to determine the closing price for each security traded by computerized trading system 16, closing price process 10 also includes trade report receiving process 24 that receives trade reports after the associated trades are executed. After a trade report is received by trade report receiving process 24, the trade report is sent to acceptable venue process 26. Acceptable venue process 26 determines if the received trade report was sent from an appropriate venue. For example, some electronically traded markets such as the Nasdaq Stock Market™ typically do not consider trades reported by NASD members to any venue outside of the Nasdaq Stock Market™. Such venues may include but are not limited to the NASD Alternative Display Facility or other unlisted trading privileges (UTP) exchanges. Also in some arrangements the Nasdaq Stock Market™ does not consider trades reported by UTP exchanges that are not executed through the Nasdaq Stock Market™ systems to determine the respective closing price. So, in one particular arrangement, if no appropriate trade activity is reported to the electronically traded market during a trading session, closing price process 10 reports no closing price for that security and entities involved in after market activities use the last received closing price such as the closing price reported from the previous trading session.

If acceptable venue process 26 determines that an appropriate venue has provided a trade report to computerized trading system 16, acceptable time process 28 determines if the received trade report was received at or prior to 4:00:02 p.m. ET. However, in some arrangements one or more times, which may or may not include 4:00:02 p.m., can be used by acceptable time process 28 in determining a closing price. Also, acceptable time process 28 determines if the received trade report is the last trade report received at or prior to 4:00:02 p.m. ET for the particular security. If it is the last received at or prior to 4:00:02 p.m. ET, acceptable time process 28 identifies the received trade report for determining the closing price for the associated security.

In some arrangements, acceptable time process 28 determines the reception time of a trade report by examining a modifier associated with the received trade report to determine if the included trade price is to be used for determining the closing price. For example, some modifiers signify if an associated trade report was reported after normal market hours, is out of range, or includes a prior reference price. However, in some arrangements modifiers are assigned so that the associated trade report is considered in calculating a closing price even though the trade report was received late. For example, a trade report that includes an ".SLD" modifier to signify the trade was reported more than 90 seconds after execution can be accepted if it is the only trade of the day.

After acceptable time process 28 identifies the received trade report for determining the closing price for the security, the trade report is sent to trade price comparison process 30. Trade price comparison process 30 determines the closing price of the particular security from the received trade report by comparing trade price included in the trade report to the inside market of the security at the time the trade report was received by trade report receiving process 24. However, as mentioned, if the trade report is received after the end of the current trading session (i.e., after 4:00 p.m. ET) but at or prior to the end of the 2-second time period (i.e., at or before 4:00:02 p.m. ET), the trade price is compared to the inside market of the security at the end of the trading session (i.e., at 4:00 p.m. ET). Inside market process 32 provides the inside market of the security associated with the trade report to trade price comparison process 30. As mentioned, if the trade price is within the security inside market, the closing price of the security is the value of the trade price included in the trade report. However, if the trade price is larger than the best ask (i.e., the lowest price any market participant seller has declared that they are willing to accept for selling a particular security at a given time) associated with the inside market, the closing price is value of the best ask. Correspondingly, if the trade price is smaller than the best bid (i.e., the highest price any market participant has declared that they are willing to pay for buying a particular security at a given time) associated with the inside market, the closing price is the value of the best bid.

After trade price comparison process 30 determines the closing price of the security, the closing price is sent to closing price reporting process 34 for reporting to computerized trading system 16 and other interested parties for after-market activities and other activities. In some arrangements one or more processes (not shown) included or not included (e.g., an industry consolidator process) in computerized trading system 16 reports the closing price to interested parties (e.g., market participants, market makers, etc.). Typically closing price reporting process 34 releases the closing prices for each security after the 90-second time period (i.e., after 4:01:30 p.m. ET) for receiving trade reports by computerized trading system 16. However, in some arrangements the closing prices, or portion of the closing prices, are released before or after this 90-second time period. Also, in some arrangements closing price reporting is performed by displaying the closing prices to users (e.g., market participants, market makers, etc.), by electronically sending the closing prices to users, or by other similar method.

Computerized trading system 16 also includes closing price retraction process 36 that monitors the trading system for cancellations and corrections to trade reports used to determine closing prices. In particular, the retraction process 36 monitors computerized trading system 16 for cancellation or corrections initiated by user 18 for the trade report used to determine a closing price. In this particular example, computerized trading system 16 allows closing prices to be cancelled or corrected up to a particular time after the trading session has ended. For example, a closing price may be cancelled or corrected until 5:15 p.m. ET. If closing price retraction process 36 detects a cancellation or correction to the trade report used to determine the closing price of a security, closing price retraction process 36 alerts closing price process 10 to recalculate the closing price for the security. If the corresponding trade report is corrected, closing price process 10 receives corrected trade price information to recalculate the associated closing price. But if the corresponding trade report is cancelled, closing price process 10 recalculates the closing price from the next eligible received trade report that is acceptable to acceptable member process 26 and acceptable time process 28. Additionally, closing price process 10 repeats functions of the other included processes (e.g., trade price comparison process 30) prior to reporting the revised closing price.

Figure 2:
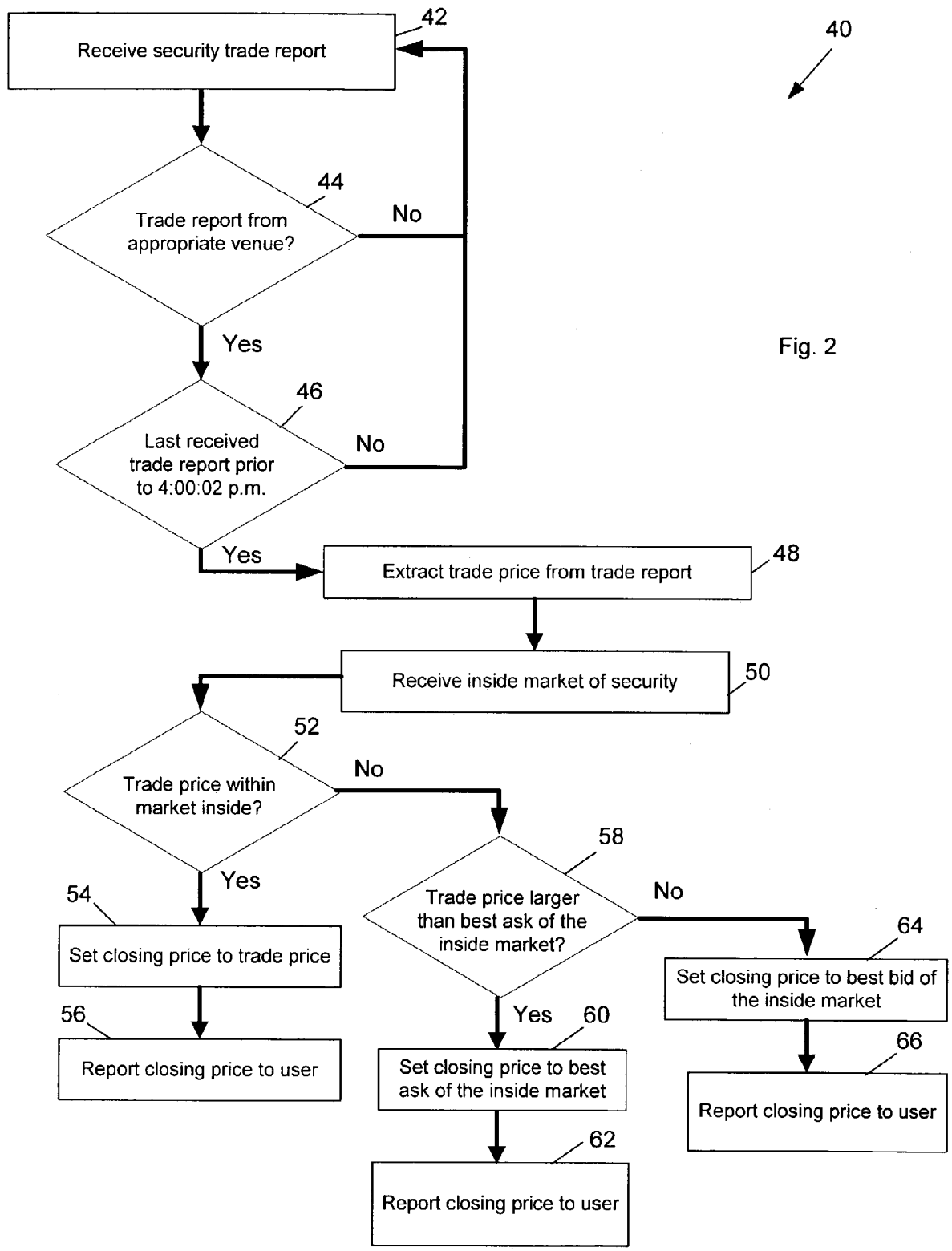
FIG. 2 is a flow chart showing a closing price method.

Referring to FIG. 2, an exemplary embodiment of the closing price process 40 is shown. Closing price process 40 receives 42 a trade report for an associated security during a trading session or within 90 seconds after the end of the trading session. After receiving 42 the trade report, closing price process 40 determines 44 if the trade report was sent from an appropriate venue. If closing price process 40 determines that the trade report was not sent from an appropriate venue, closing price process 40 returns to receive the next trade report. If determined that the venue is appropriate, closing price process 40 determines 46 if the trade report is the last trade report associated with the respective security received during the trading session or at or prior to two seconds after the end of the trading session (i.e., 4:00:02 p.m. ET). If determined that the received trade report is not the last received trade report of the respective security for this particular time period, closing price process 40 returns to receive 42 the next trade report. If determined that the received trade report is the last trade report received in this time period, closing price process 40 extracts 48 the trade price included in the trade report and then receives 50 the inside market of the security for comparison to the trade price. If the trade report was received prior to the ending of the trading session, the inside market used for comparison is the inside market of the security at the time the trade report was received. However, if the trade report was received at or after the end of the trading session, the inside market of the security at the end of the trading session is used for comparison. After receiving 50 the inside market of the security associated with the trade report, the closing price process 40 determines 52 if the trade price is within the received inside market of the security. If determined that the trade price is within the received inside market, closing price process 40 sets 54 the value of the closing price of the security to the value of the trade price and reports 56 the closing price to the user for after-market activities and for use as a start-up price for the next trading session.

If determined that the trade price is not within received inside market, closing price process 40 determines 58 if the trade price is larger than the best ask of the inside market. If determined that the trade price is larger than the best ask of the inside market, closing price process 40 sets 60 the value of the closing price to the value of the best ask of the inside market and reports 62 the closing price to the user for after-market activities and for use as a start-up price for the next trading session. If determined that the trade price is not larger than the best ask of the inside market, then the trade price is smaller than the best bid of the inside market. Closing price process 40 sets 64 the value of the closing price to the value of the best bid price of the inside market and reports 66 the closing price for after-market activities and for use as a start-up price for the next trading session.

Figure 3:
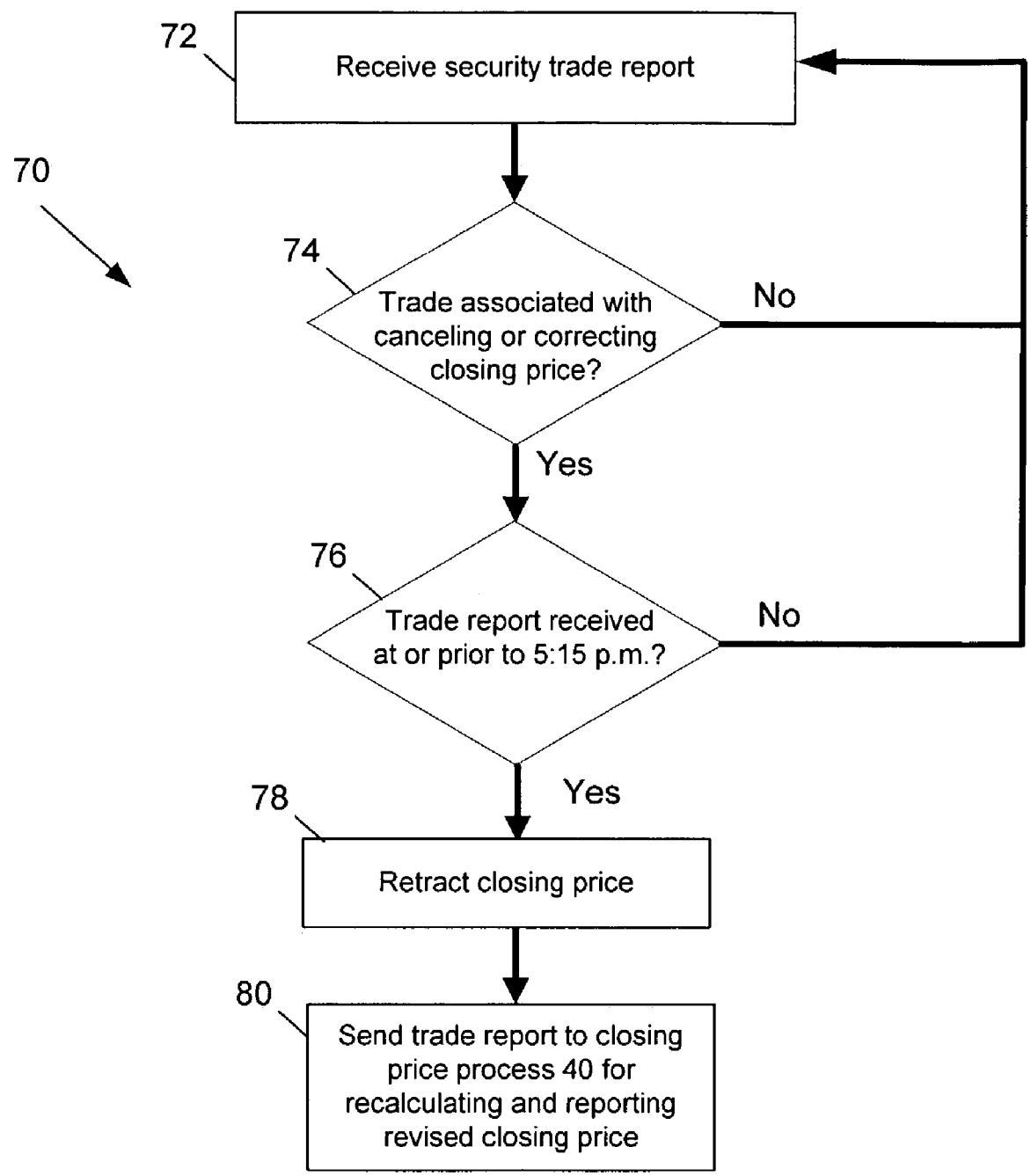
FIG. 3 is a flow chart showing a closing price retraction method.

Referring to FIG. 3 an exemplary embodiment of the closing price retraction process 70 is shown. Closing price retraction process 70 receives 72 a trade report for an associated security traded on computerized trading system 16 (shown in FIG. 1). After receiving 72 the trade report, closing price retraction process 70 determines 74 if the received trade report is associated with canceling or correcting a trade report used to determine the closing price of the associated security. If determined that the received trade report is not associated with canceling or correcting a trade report used to determine the closing price, closing price retraction process 70 returns to receive 72 the next trade report. If determined that the received trade report is associated with canceling or correcting a trade report used to determine the closing price, closing price retraction process 70 determines 76 if the trade report was received at or prior to 5:15 p.m. ET. In other arrangements, a time before or after 5:15 p.m. ET is used by closing price retraction process 70. If determined that the trade report was not received at or prior to 5:15 p.m. ET, closing price retraction process 70 returns to receive 72 the next trade report and repeats. If determined that the trade report was received at or prior to 5:15 p.m. ET, closing price retraction process 70 retracts 78 the previously reported closing price of the security and sends 80 the trade report to the closing price process 40 (shown in FIG. 2) to determine and report a revised closing price for the associated security.

The closing price process 10 (shown in FIG. 1) described herein is not limited to the embodiment described above; it may find applicability in any computing or processing environment. The closing price process may be implemented in hardware, software, or a combination of the two. For example, the closing price process may be implemented using circuitry, such as one or more of programmable logic (e.g., an ASIC), logic gates, a processor, and a memory.

The closing price process may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the closing price process. The closing price process may also be implemented as a machine-readable storage medium, configured with a computer program, where, upon execution, instructions in the computer program cause a machine to operate to perform the functions of the closing price process described above.

Embodiments of the closing price process may be used in a variety of applications. Although the closing price process is not limited in this respect, the closing price process may be implemented with memory devices in microcontrollers, general purpose microprocessors, digital signal processors (DSPs), reduced instruction-set computing (RISC), and complex instruction-set computing (CISC), among other electronic components.

Embodiments of the closing price process may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer implemented method for determining a closing price of a security traded in an electronic trading system, the method comprises:
   receiving by a computer system, up until a predetermined time limit after an end of a regular trading session of the electronic trading system, trade prices of one or more executed trades of the security, the one or more executed trades occurring during the trading session;
   identifying a trade price that is received most recently relative to a predetermined time point after the end of the regular trading session and within the predetermined time limit;
   comparing by the computer system the identified trade price to an inside market of the security to determine the closing price of the security, while the trade prices received after the receipt of the identified trade price and within the predetermined time limit are excluded from determining the closing price;
   determining the closing price, with the closing price being related to either the value of the identified trade price if the identified trade price is within the inside market price of the security or the value of a best ask of the inside market price if the identified trade price is larger than the best ask or the value of a best bid of the inside market price if the identified trade price is smaller than the best bid; and
   reporting the determined closing price of the security to a user.

2. The method of claim 1 wherein the predetermined time point is two seconds after the end of the trading session of the electronic trading system.

3. The method of claim 1 wherein the predetermined time limit is 90 seconds after the end of the regular trading session of the electronic market.

4. The method of claim 1 wherein the inside market price of the security is at the time the trade price is received.

5. The method of claim 1 wherein the inside market price of the security is at the end of the trading session.

6. The method of claim 1 wherein the closing price is the value of the identified trade price if the identified trade price is within the inside market price of the security.

7. The method of claim 1 wherein the closing price is the value of a best ask of the inside market price if the identified trade price is larger than the best ask.

8. The method of claim 1 wherein the closing price is the value of a best bid of the inside market price if the identified trade price is smaller than the best bid.

9. The method of claim 1 further comprising:
   retracting the reported closing price if the identified trade price is cancelled.

10. The method of claim 9 wherein the identified trade price is cancelled within a time period after the end of the trading session.

11. The method of claim 1 further comprising:
    retracting the reported closing price if the identified trade price is corrected.

12. The method of claim 1 wherein the determined closing price is reported after a time period following the end of the trading session.

13. The method of claim 1 wherein the trade prices are included in trade reports.

14. A computer program product tangibly embodied on a computer readable medium comprises instructions for determining a closing price of a security traded in an electronic trading system, the instructions cause a computer to:
    receive, up until a predetermined time limit after an end of a regular trading session of the electronic trading system, trade prices of one or more executed trades of a security, the one or more executed trades occurring during the trading session;
    identify a trade price that is received most recently relative to a predetermined time point after the end of the regular trading session and within the predetermined time limit;
    compare the identified trade price to an inside market price of the security to determine the closing price of the security, while the trade prices received after receipt of the identified trade price and within the predetermined time limit are excluded from determining the closing price;
    determine the closing price, with the closing price being related to either the value of the identified trade price if the identified trade price is within the inside market price of the security or the value of a best ask of the inside market price if the identified trade price is larger than the best ask or the value of a best bid of the inside market price if the identified trade price is smaller than the best bid; and
    report the determined closing price of the security to a user.

15. The computer program product of claim 14 wherein the predetermined time point is two seconds after the end of the trading session of the electronic trading system.

16. The computer program product of claim 14 wherein the predetermined time limit is 90 seconds after the end of the regular trading session of the electronic market.

17. The computer program product of claim 14 wherein the inside market price of the security is at the time the trade price is received.

18. The computer program product of claim 14 wherein the inside market price of the security is at the end of the trading session.

19. The computer program product of claim 14 wherein the closing price is the value of the identified trade price if the identified trade price is within the inside market price of the security.

20. The computer program product of claim 14 wherein the closing price is the value of a best ask of the inside market price if the identified trade price is larger than the best ask.

21. The computer program product of claim 14 wherein the closing price is the value of a best bid of the inside market price if the identified trade price is smaller than the best bid.

22. The computer program product of claim 14 further comprising instructions to cause the computer to:
retract the reported closing price if the identified trade price is cancelled.

23. The computer program product of claim 22 wherein the identified trade price is cancelled within a time period after the end of the trading session.

24. The computer program product of claim 14 further comprising instructions to cause the computer to:
retract the reported closing price if the identified trade price is corrected.

25. The computer program product of claim 14 wherein the determined closing price is reported after a time period following the end of the trading session.

26. The computer program product of claim 14 wherein the trade prices are included in trade reports.

27. A computer system for determining a closing price of a security traded in an electronic trading system, the computer system comprises:
a processor;
memory coupled to the processor; and
a computer readable medium storing a computer program product comprising instructions for causing the computer to:
receive, up until a predetermined time limit after an end of a regular trading session of the electronic trading system, trade prices of one or more executed trades of the security wherein the one or more executed trades are executed during the regular trading session;
identify a trade price that is received most recently relative to a predetermined time point after the end of the trading session and within the predetermined time limit;
compare the identified trade price to an inside market price of the security to determine the closing price of the security, while the trade prices received after the receipt of the identified trade price and within the predetermined time limit are excluded from determining the closing price;
determine the closing price, with the closing price being related to either the value of the identified trade price if the identified trade price is within the inside market price of the security or the value of a best ask of the inside market price if the identified trade price is larger than the best ask or the value of a best bid of the inside market price if the identified trade price is smaller than the best bid; and
report the determined closing price of the security to a user.

28. The computer system of claim 27 wherein the predetermined time point is two seconds after the end of the trading session of the electronic trading system.

29. The computer system of claim 27 wherein the predetermined time limit is 90 seconds after the end of the regular trading session of the electronic market.

30. The computer system of claim 27 wherein the inside market of the security is at the time the trade price is received.

31. The computer system of claim 27 wherein the inside market price of the security is at the end of the trading session.

32. The computer system of claim 27 wherein the closing price is the value of the identified trade price if the identified trade price is within the inside market price of the security.

33. The computer system of claim 27 wherein the closing price is the value of a best ask of the inside market price if the identified trade price is larger than the best ask.

34. The computer system of claim 27 wherein the closing price is the value of a best bid of the inside market price if the identified trade price is smaller than the best bid.

35. The computer system of claim 27 further comprising:
a retracting process to retract the reported closing price if the identified trade price is cancelled.

36. The computer system of claim 35 wherein the identified trade price is cancelled within a time period after the end of the trading session.

37. The computer system of claim 27 further comprising:
a retracting process to retract the reported closing price if the identified trade price is corrected.

38. The computer system of claim 27 wherein the determined closing price is reported after a time period following the end of the trading session.

39. The computer system of claim 27 wherein the trade prices are included in trade reports.

* * * * *